F. SODDY.
METHOD OF STRIPPING THE ILLUMINANTS FROM AND OF PURIFYING COAL GAS BY MEANS OF CHARCOAL.
APPLICATION FILED APR. 11, 1919.

1,422,007.

Patented July 4, 1922.
4 SHEETS—SHEET 1.

Witnesses:

Inventor
Frederick Soddy

F. SODDY.
METHOD OF STRIPPING THE ILLUMINANTS FROM AND OF PURIFYING COAL GAS BY MEANS OF CHARCOAL.
APPLICATION FILED APR. 11, 1919.

1,422,007.

Patented July 4, 1922.

UNITED STATES PATENT OFFICE.

FREDERICK SODDY, OF ABERDEEN, SCOTLAND.

METHOD OF STRIPPING THE ILLUMINANTS FROM AND OF PURIFYING COAL GAS BY MEANS OF CHARCOAL.

1,422,007. Specification of Letters Patent. Patented July 4, 1922.

Application filed April 11, 1919. Serial No. 289,352.

*To all whom it may concern:*

Be it known that I, FREDERICK SODDY, a subject of the King of Great Britain, residing in Aberdeen, Scotland, have invented a certain new and useful Method of Stripping the Illuminants from and of Purifying Coal Gas by Means of Charcoal, of which the following is a specification.

My invention relates to a method of treating coal-gas to separate the illuminants from the non-illuminant hydrocarbon and other gases. By coal-gas I mean the mixture of gases obtained by the carbonization or destructive distillation of coal and other fuels, oil-bearing minerals and the like.

It has of late become the practice to remove from coal-gas some of the illuminants, notably the benzene, which it contains, the operation being known as stripping the benzene from the gas. The known processes are fairly successful though incomplete so far as the illuminants such as benzene and naphthalene, which are liquid or solid at the ordinary temperature are concerned, but little success has attended efforts to remove ethylene and other illuminants which are gaseous at ordinary temperature. My invention is applicable to both classes of illuminants.

The method is based on the power of charcoal to absorb the illuminants at ordinary temperature (that is to say, the prevailing atmospheric temperature). Although it has been shown by Sir James Dewar (British specification No. 13638 of 1904) that by passing coal gas through charcoal cooled to −80° C., the gaseous hydrocarbons are absorbed and separated from the hydrogen and carbon monoxide, it has not been known that when the charcoal is not cooled an absorption and separation of the illuminants occurs to an extent which renders possible an industrial process for the substantial isolation of ethylene.

I have studied the behaviour of charcoal towards coal-gas. I find that at the ordinary temperature one ton of charcoal serves to remove the ethylene from 10,000 cub. ft. of coal-gas of average composition. Absorption ceases when the ethylene amounts to rather more than 1 per cent by weight of the charcoal, or, by volume, about 300. cub. ft. of ethylene per ton of charcoal. After condensation of the vapours of liquids by a condenser, the volume of gases expelled by heating the charcoal saturated in a stream of coal gas is usually of the order of 1000 cub. ft. per ton of charcoal and comprises as a rough average one-third ethylene, one-third other illuminants, such as ethane and propylene and their higher homologues, and one-third other gases.

About one-tenth of the proportion of charcoal required to absorb the ethylene will generally suffice for completely stripping the benzene and liquid illuminants from coal gas, and charcoal will absorb benzene from coal-gas which has been already stripped of this constituent by the process of scrubbing with oil as usually practised. Indeed, from such gas the absorption of benzine will continue until the charcoal contains 10–15 per cent of its weight of benzene.

Constituents intermediate between ethylene and benzene in volatility are absorbed by charcoal to an extent intermediate between ethylene and benzene, so that the weights absorbed in proportion to the weight of charcoal are intermediate between the weights of ethylene and benzene absorbed.

In my invention coal-gas, preferably previously purified when necessary, is passed through charcoal not cooled substantially below the ordinary temperature (that is to say, the prevailing atmospheric temperature) and the charcoal is subsequently heated to expel the absorbed constituents.

The invention includes a method by which the process may be made continuous and which depends in part on the known principle underlying methods of scrubbing generally, namely that continued passage of the gas causes displacement of the more volatile constituents first absorbed, by the less volatile constituents as these accumulate in the scrubbing agent. Thus, if the gases expelled from the charcoal by heat after passage through one ton of the charcoal of 10,000 cubic feet of coal-gas and after passage of 100,000 cubic feet are examined, it will be found that the gases expelled in the second case contain actually less ethylene and much more benzene than the gases expelled in the first case contain. The process also depends on the well-known fact that the expulsion of a dissolved or absorbed gas by heat is aided by diminishing the partial pressure of that gas in the atmosphere surrounding the solvent or absorbent. Thus, by heating the charcoal that has absorbed illuminants in a stream of coal gas, or better of the already stripped coal-gas, the charcoal may be, so to say, washed easily from the less volatile constituents which it has absorbed, before it is cooled for re-use in the process.

Before describing the continuous process mention must be made of the intermittent process, which has the advantage of requiring less costly and elaborate plant, and is particularly applicable when waste heat from gas retorts is available.

It must be premised that whatever the mode of treating the coal-gas with charcoal to absorb the illuminants, sulphur compounds, such as carbon bisulphide and sulphuretted hydrogen, should first be removed from the gas. The sulphur compounds are absorbed by the charcoal effectively, but the charcoal deteriorates in absorbing power when unpurified gas is used. It is also of advantage that carbon dioxide and water vapour should be removed as representing useless diluents subtracting from the efficiency of the charcoal as an absorbent of illuminants. Hence the process is best applied to gas which has undergone the usual purification process for removal of these impurities. But a still further purification is desirable when the separation of the more volatile illuminants, particularly ethylene, is the main object of the treatment. As already stated the ethylene is displaced from the charcoal as benzene accumulates, and the charcoal is so efficient in removing benzene that even though the gas has already been subjected to a process for stripping the benzene from it, there should be a preliminary treatment with charcoal for completing this purpose. The intermittent process is well adapted for such preliminary stripping and may therefore be used with advantage in conjunction with the continuous process.

The intermittent process for preliminary scrubbing or stripping may resemble usual methods of purification. The scrubber may be taken out of the sequence when saturated, heated to expel the benzene through a condenser, cooled and put back in countercurrent order. The benzene begins to be expelled from the charcoal when the temperature attains 100° C. or less, but a temperature between 300 and 400° C. is required for its complete expulsion. Whether the intermittent or continuous process be used for removing ethylene and the like, a short cycle with rapid heating and cooling is desirable. The temperature for expulsion is somewhat lower than that for expelling benzene, but an occasional slower cycle with increased heating may be desirable to preserve the charcoal from deterioration. For fairly complete scrubbing, a period of 3-5 minutes contact between gas and charcoal is ample, but with good charcoal this period can be considerably reduced without much ethylene escaping absorption. On account of the low thermal conductivity of charcoal, layers to be quickly heated and cooled must be as thin as is practicable. A layer of about 4 inches thick is about as small as can be practically used. Greater thicknesses should be stirred during heating and cooling.

In the accompanying drawings which illustrate apparatus wherein the invention may be applied.

Figure 1:
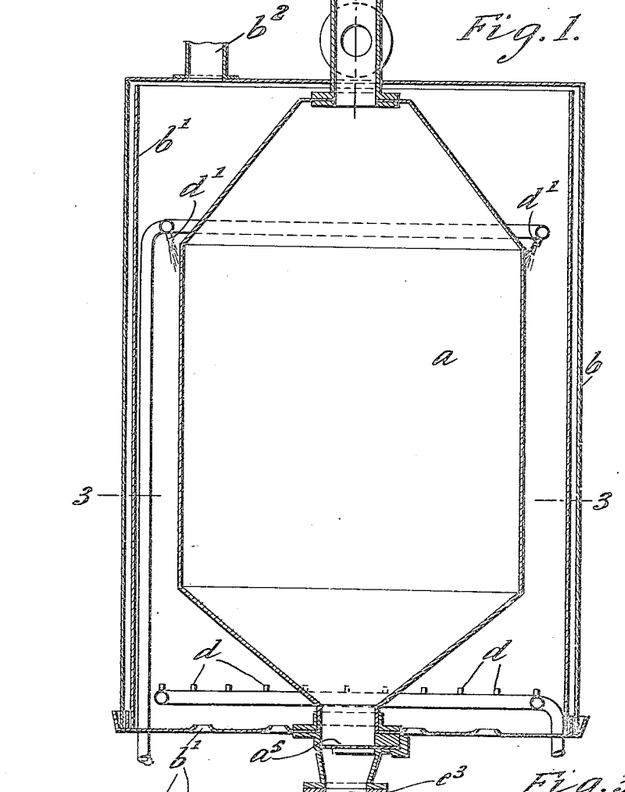
Figs. 1 and 2 are vertical sections in planes at right angles to each other through a pair of containers designed to be charged with charcoal which is to be treated with coal-gas.
Figure 2:
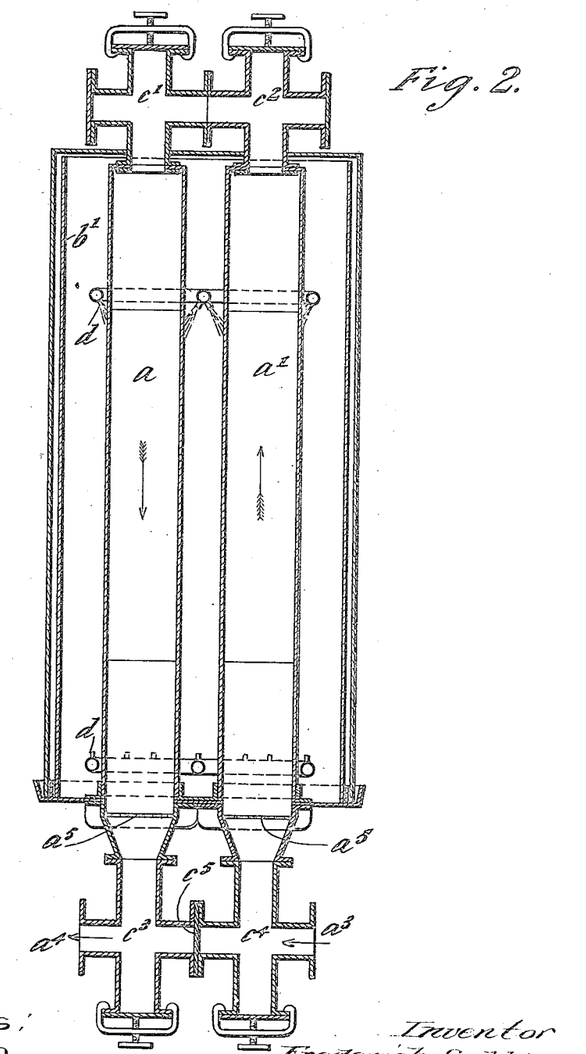
Figure 3:
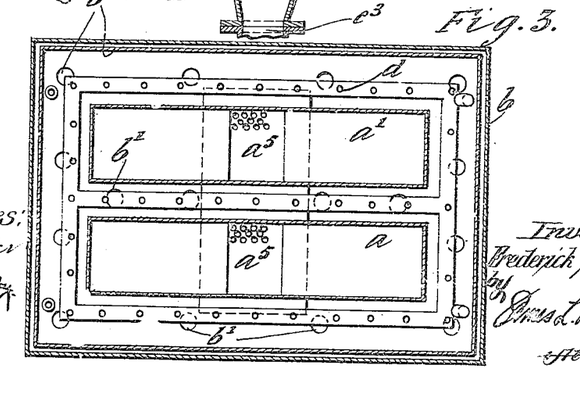
Fig. 3 is a sectional plan on line 3—3 of Fig. 1.

Referring to Figs. 1-3 $a$, $a'$ represent rectangular sheet iron containers with truncated corners, enclosed in a sheet-iron casing $b$ having a lining $b'$ of hard asbestos sheet. The charcoal is retained in the container by a perforated plate $a^5$ which can be withdrawn. At top and bottom the containers are provided with four-way pipes $c'$, $c^2$, $c^3$, $c^4$, serving for charging and discharging the containers with charcoal and for gas connections; they also serve for connecting any number of containers either in parallel or in series with reference to the current of gas. In the case shown the containers are in series; the gas enters at $a^3$, and is compelled by plate $c^5$ to travel through the containers in succession and leaves at $a^4$. When the gas has been passed for the required period the unit is cut out of the gas current by operating suitable valves and connected with a gas-holder, through a condenser; the gas burners $d$ are now ignited and the containers heated to about 300° C., whereby the absorbed illuminants are expelled, the vapours being condensed in the condenser and the gases collected in the holder. When expulsion is complete the unit (it may be after blowing air through it for revivifying the charcoal as hereinafter described), is included again in the current of gas, the burners are extinguished and water jets $d'$ are turned on to cool the containers. The apertures $b'$ in the bottom of the casing admit air for combustion and subsequently permit escape of cooling water. The products of combustion escape by flue $b^2$. It will be understood that where waste heat is available it should be employed in preference to the mode of heating described.

A complete scrubbing of coal-gas by means of the units illustrated in Figs. 1—3 will be described, though it must be understood, that the second scrubbing to recover the gaseous illuminants may not be wanted, in which case the second series of scrubbers is dispensed with, or it may be preferable to carry out this part of the process by the continuous method later described. A number of units, aggregated into sets of suitable size, say three or more sets, of the kind illustrated in Figs. 1—3, are connected in series, in the manner commonly used for gas purifiers, whereby the set of units through which the gas first passes is cut out as the charcoal therein becomes saturated, heated and its absorbed constituents expelled, and then put back at the end of the series so that the gas stream passes through it last after having passed through the others.

There are two such series of several sets of units, also in series, the gas streams passing first through the first series in which the liquid illuminants are absorbed, and then through the second series in which the gaseous illuminants are absorbed. The quantity of gas passed relative to the quantity of charcoal, before heating the charcoal to expel the absorbed illuminants, is many times greater, for example ten times greater, in the first series of scrubbers than in the second series, but otherwise the mode of operation of the two series is similar.

Dealing with the second set of scrubbers first, if the quantity of charcoal is sufficient relatively to the quantity of gas passed, the gas leaving consists of hydrogen, carbon monoxide, methane and nitrogen. The gas expelled on heating consists of some 25 per cent of ethylene, a somewhat smaller proportion of other gaseous illuminants, propylene, ethane and their homologues, with usually about 60 per cent of hydrogen, methane and carbon monoxide.

In the first set of scrubbers, where the quantity of gas passed relatively to the quantity of charcoal is some ten times as great as in the second set, the charcoal soon becomes saturated with respect to the ethylene, and the gas passing on to the second set thus contains nearly its original quantity of ethylene; but, if the quantity of charcoal is sufficient relatively to the quantity of gas passed, the benzene and liquid illuminants are held back practically completely. As these accumulate some of the ethylene first absorbed is displaced from the charcoal and sent forward. On heating the charcoal the liquid illuminants are expelled, together with a quantity of gas, weight for weight of the charcoal somewhat less than is obtained in the second scrubbing, and richer in the less volatile constituents, such as propylene.

It must be understood that the division of the scrubbing into two successive operations is taken as an illustration, and that it may be an advantage further to divide the process. Thus it may prove an advantage to introduce, before the first and second scrubbing above described, a series of scrubbers in which the quantity of gas passed relatively to the quantity of charcoal is much greater than in the next series, with the object of holding back naphthalene, tar-spray and sulphur compounds, and thereby preserving the charcoal subsequently employed from deterioration for a longer period without renewal or revivification by the method presently to be described. This division of the scrubbing process applies equally when the continuous method or a combination of the two methods is used.

Turning now to the continuous method, the general principle involved is the continuous travel of the charcoal first through a cool chamber in which it is exposed to the current of gas at ordinary temperature and then through a heated chamber in which it is cut off from the gas current, the expelled illuminants being suitably withdrawn. There are several known apparatus for conducting an operation of this kind. According to my invention the principle is applied in such a manner that a certain fractionation of the illuminants from the non-illuminants is attained, whereby a more concentrated product may be continuously obtained than is possible by known methods of absorbing and recovering on the aforesaid general principle.

By my invention the expelled gases are withdrawn in two portions, the portion expelled during the initial stages of the heating being exposed to the cooler and still unheated parts of the charcoal, while the portion expelled during the later stages of the heating is withdrawn over the hotter parts of the charcoal. The following action occurs. The charcoal at ordinary temperature is saturated with illuminants at a partial pressure corresponding with that in the original coal-gas. On warming the charcoal there is expelled a gas richer in illuminants than the original gas but poorer in illuminants than the gas remaining in the charcoal. As the gas expelled passes over cooler charcoal it gives up illuminants to the charcoal and receives non-illuminants which the charcoal contains, the exchange continuing until the gas in contact with charcoal at ordinary temperature has the same proportion of illuminants as the original coal-gas; the expelled gas may now be mixed with the coal-gas entering the system and be re-treated therewith. The part of the expelled gases which is drawn over the hotter parts of the charcoal is withdrawn from the system and contains illuminants in greater concentration the smaller the part thus withdrawn.

Figures 4, 5:
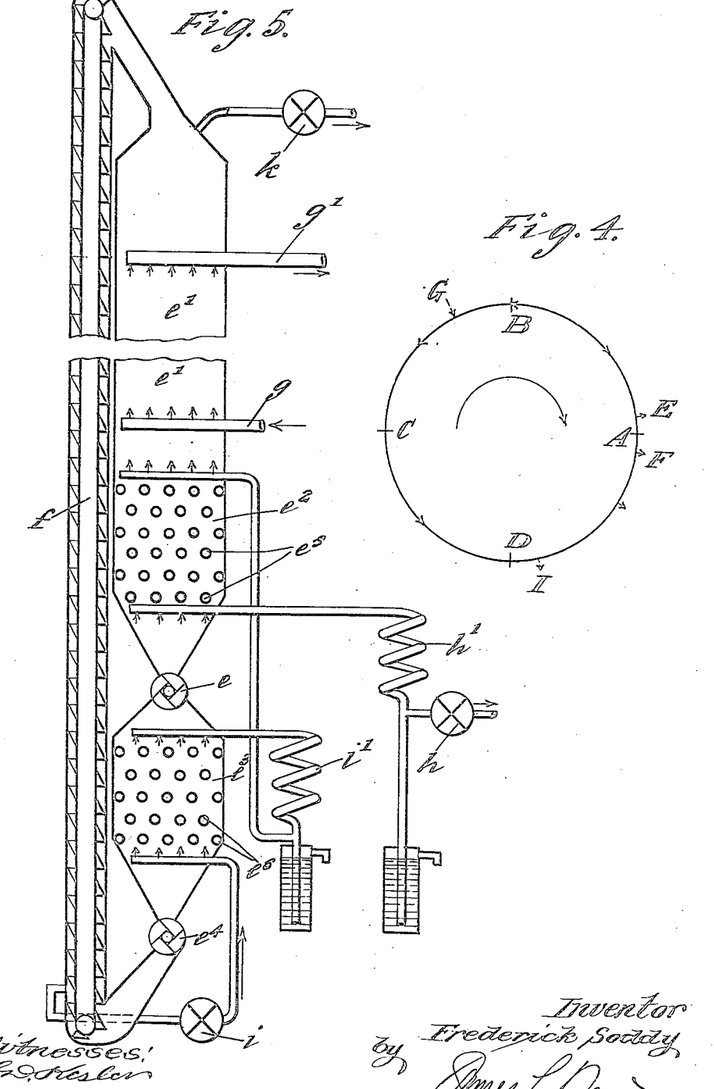
Fig. 4 is a diagram illustrating a continuous method of treating charcoal with coal-gas.
Fig. 5 shows in diagrammatic vertical section an apparatus for applying the principle illustrated by Figure 4.

The diagram shown in Fig. 4 of the accompanying drawings illustrates the method. The circle A, B, C, D represents a continuous ring of charcoal with through gas passage except at A where the flow of gas is checked by a valve. On one side of this valve the concentrated illuminants are withdrawn through a pipe at E and on the other side the stripped gas leaves through a pipe at F. Fresh coal-gas enters by a pipe at G. The charcoal travels continuously in the direction of the central arrow and is gradually heated as it passes from B to A, and cooled as it passes from A towards D. In the quadrant A B the absorbed gases are expelled by the heat and a certain proportion of them is withdrawn through pipe E, through a condenser, while the rest travels in the opposite direction to the charcoal and joins the fresh coal-gas entering at G. From G the coal-gas passes in counter-current to the charcoal and leaves at F. The charcoal passing the valve at A will carry with it a small part of the illuminants which would escape with the stripped gas at F and not be recovered. To meet this loss the main stream of stripped gas may leave the charcoal at some point H nearer to D than F and only so much of the stream allowed to proceed to F as will wash the illuminants from the still hot charcoal and carry them away at F. The gas thus leaving at F is best returned through a condenser to the system at a point such as B so that it may pass over cool charcoal saturated with respect to the illuminants in the original coal-gas.

The gases expelled on heating the charcoal used for the preliminary scrubbing may after condensation of the benzene and purification, if necessary, be returned to the system at the same point and their illuminants so recovered.

It will be understood that, in a gas consisting mainly of carbon monoxide, methane and hydrogen, charcoal absorbs the carbon monoxide and methane preferentially, and after the illuminants present in the gas have been removed a further separation of a small part of these gases may be carried out. Hence, if the main stream of stripped gas leaves at some point I still nearer to the point D than H, the portion which travels to H may be deprived of much of its methane and carbon monoxide, so that from the point H a gas rich in hydrogen may be withdrawn.

Referring now to Fig. 5, this represents a tower subdivided into two chambers by a valve $e$. The upper part $e'$ of the upper chamber is the absorber, the lower part $e^2$ (containing heating pipes $e^5$) is the heater, while the lower chamber $e^3$ (containing cooling pipes $e^6$) is the cooler and has a valve $e^4$ at its lower part. These valves $e$ $e^4$ are of any known type for transferring a solid while checking passage of gas; they need not in this case be completely gas-tight so long as they effectively check gaseous flow. The charcoal descends the tower by gravity and is again raised by a conveyer $f$ working in a gas-tight casing. The main stream of coal-gas enters at $g$ and leaves at $g'$, substantially stripped by the charcoal descending the tower, and consisting essentially of hydrogen, methane, carbon monoxide and nitrogen, the ethylene, ethane and their homologues being absorbed by the charcoal, together with the liquid illuminants if these have not been removed in a previous scrubbing. As the charcoal passes among the heating pipes $e^5$ it loses its absorbed gases and vapours, some of which are withdrawn by pump $h$ through a condenser $h'$ while the rest descend to join the gas entering at $g$. The part of the expelled gas so ascending is subjected to the fractionating action before described. It consists of the gas expelled in the initial stages of the heating of the charcoal, which in passing over successively cooler layers of charcoal is deprived of its excess of illuminants by the charcoal and gains from the charcoal a part of the non-illuminants previously absorbed by the charcoal before it was heated. The gases withdrawn by the pump $h$ through the condenser $h'$, consist of the part of the absorbed gases expelled in the later stages of the heating. They consist of the illuminants in the coal-gas in a highly concentrated condition, the removal of which from the coal-gas is the object of the invention. As already explained, the gas so removed is the richer in illuminants the less of it that is so withdrawn. The volume withdrawn must not be less than the volume of the total illuminants in the gas passed through and may, in general, be somewhat greater than this volume.

For washing the charcoal descending among the pipes $e^6$, stripped gas is withdrawn in determined amount from the top of the tower, passing down the casing of the elevator, by pump $i$ and is caused to pass through the cooler so as to carry the illuminants from the charcoal therein (through a condenser $i'$, if necessary), into the upper chamber at a place above the heating tubes $e^5$. The volume of gas so used for washing may be somewhat greater than, for example, from two to four times as great as, the volume of charcoal passing down the tower. A pump $k$ may withdraw a gas rich in hydrogen from the upper part of the tower.

By this means a small part of the stripped gas, which otherwise would leave by the exit pipe $g'$, is caused to pass through a relatively large mass of fresh charcoal at ordinary temperature which has not yet absorbed any gas and, in consequence, the methane and carbon monoxide are absorbed preferentially and the content in hydrogen of the part not absorbed thereby increased.

It will be understood that the washing of the charcoal with stripped gas with the double object of preventing the accumulation in it of the less volatile and more difficultly removed constituents and the recovery of the small and relatively unimportant part of the illuminants it carries along with it in its pores, and also the withdrawal of a small part of the total gas richer in hydrogen than the main quantity of stripped gas, are subsidiary to and not essential to the main process which can be operated without them. In this case the pump $i$, condenser $i''$ with their connecting pipes, and the pump $k$ may be dispensed with, and the exit pipe $g'$ taken from the top of the tower.

To construct an apparatus thus diagrammatically represented, regard must be had to the conditions under which charcoal will flow under gravity. Lumps which will pass through a 1 inch sieve will flow through a pipe of circular cross-section 6 inches in diameter but will bridge in a pipe 4 inches in diameter. It will flow through a rectangular slot 3 inches wide, but 4 inches is a safer dimension. Its angle of repose is about 45° and the sides of a hopper through which it is to flow without bridging should make an angle of not less than 50° with the horizontal.

Figures 6, 7, 8, 9, 10:
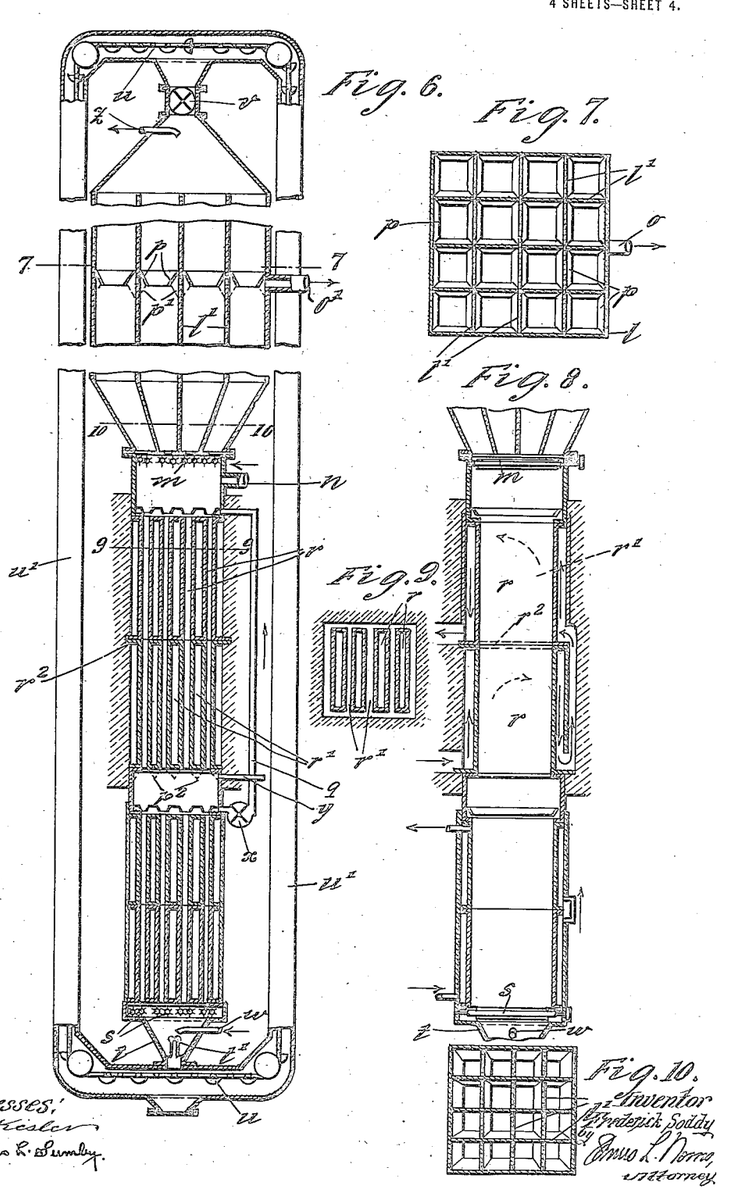
Fig. 6 is a diagrammatic sectional elevation of another form of apparatus for applying the principle illustrated by Fig. 4.
Fig. 7 is a cross section on line 7—7 of Fig. 6.
Fig. 8 is a vertical section in a plane at right angles to that of Fig. 6.
Figs. 9 and 10 are respectively sections on lines 9—9 and 10—10 of Fig. 6.

In Fig. 6 the interior of the absorber $l$ is subdivided by vertical plates $l'$ in planes at right angles to each other into elongated cells down which the charcoal descends. The descent is regulated and made uniform over the cross sectional area of the tower by means of the grooved rollers $m$ rotated by suitable mechanism. The coal-gas enters the absorber at $n$ and leaves it at $o$ (Fig. 6), consisting essentially of hydrogen, methane, carbon monoxide and nitrogen. To ensure a uniform withdrawal of the gas over the cross section of the tower, at the plane of the exit $o$ there are fixed in the cells rectangular funnels $p$ and the vertical partitions are perforated at the places which are behind these funnels (Fig. 7). The charcoal descending through the funnels assumes the angle of repose indicated by dotted lines $p'$, leaving spaces which are all in communication with each other and with the exit $o$ through the said perforations. A like construction is provided at the ends of the by-pass $q$ referred to below, and the charcoal also takes up its natural angle of repose, indicated by $p^2$ at the line of the exit $y$.

The charcoal having left the absorber descends the heater which is also of cellular structure, but the cells $r$ alternate with heating flues $r'$ divided into an upper and a lower set by horizontal partitions $r^2$. They may in addition be subdivided by transverse partitions in planes parallel to the paper (Fig. 6). As shown in Fig. 8 heating gases circulate first through the lower heating flues and then through the upper, so that the lower part of the heater is the more strongly heated and the heat is used economically. Having left the heater the charcoal descends through the cooler which is similarly constructed with upper and lower flues for circulation of cooling gases or liquid as indicated in Fig. 8. In passage through the heater and cooler the relative movement that occurs among the pieces of charcoal decreases the time required for heating and cooling the charcoal. At the bottom of the cooler are grooved rollers $s$ to regulate the descent, driven by any suitable mechanism. From the cooler the charcoal travels through a hopper $t$, having a suitable device, such as two flaps $t'$, which is so geared to the conveyor $u$ that it permits passage of charcoal only when there is a bucket of the conveyor beneath the discharge opening. For instance, flaps $t'$ may assume the position shown each time a conveyor bucket is beneath the discharge opening of the hopper and may be turned into the position to close the hopper as soon as the bucket has passed. The conveyor discharges the charcoal to the rotating bucket valve $v$ at the top of the absorber.

As in the case of Fig. 5, stripped gas, which may be taken from the main stream of stripped gas is delivered in regulated amount through a pipe $w$ into the lower part of the cooler and a corresponding amount is withdrawn by pump $x$ from the upper part and passed through by-pass $q$ to the upper part of the heater. The illuminants are withdrawn at $y$. Gas rich in hydrogen may be withdrawn at $z$, or in the event of this not being required the main stream of stripped gas may leave at $z$ instead of at $o$. The meters or pumps controlling the flow of gases through the pipes $w$ and $q$ are driven at a constant relative speed found, by trial, best to prevent intermixture of the illuminants with the gas used for washing the charcoal, which in this form of apparatus serves also to prevent the gases expelled in the heater from being re-absorbed in the cooler, and is kept as small in volume as is found by trial to be effective for this purpose.

The fractionating effects in the part of the expelled gases passing upwards in the heater to rejoin the main stream at $n$ and in the part of the gas passing upward above the exit $o$ to the exit $z$, are precisely similar to those already described in the case of Fig. 5.

Since the absorption of a gas from a mixture of gases is increased by increasing the partial pressure of that gas in the mixture, it may be advantageous, when the process is conducted for the express purpose of producing ethylene or other constituent rather than for recovering the valuable constituents from coal-gas made by existing processes, to vary the normal conditions of carbonization to produce an increased proportion of ethylene or desired constituent. Again, it may be of advantage to apply the process only to that portion of coal-gas which is produced during the early stages of carbonization and contains more ethylene than the later portions contain.

As regards the variety of and method of preparation of the charcoal to be used in this process, the charcoal prepared from cocoa-nut shells and other dense varieties of wood charcoal is well suited for the purpose, but this is not always obtainable in large quantities or sufficiently cheaply. A special examination of the relative merits of various kinds and qualities of charcoal for the stripping of coal-gas has shown that the actual weight of a gas absorbed by a given weight of amorphous carbon when saturated with the gas varies but little with the quality of the charcoal. Even bone charcoal containing but little amorphous carbon absorbs proportionally to its carbon content, and structureless charcoal, prepared by the carbonization of sugar, is not different in this respect from wood charcoals. The important characteristics of the charcoal for this purpose are two. First, the apparent density or weight capable of being contained in a given vessel is, other things being equal, a measure of suitability, since the volume and dimensions of the plant required to take a given weight of charcoal depends on the apparent density of the charcoal with which it is filled. Secondly, the rate of absorption of the gas by the charcoal varies with different varieties, the mode of carbonization and previous history. Weight for weight, as good charcoal as the best cocoa-nut shell charcoal may be prepared by the ordinary methods of carbonizing beech and other common hard-woods at high temperature and cooling the charcoal out of contact with air. Before use the charcoal should be heated, preferably in a current of stripped coal-gas, to remove water and other constituents absorbed from the atmosphere. With continued use the rate of absorption of the charcoal for gases becomes slower. The charcoal may be revivified and its absorptive qualities restored, and often improved by treating it with chlorine, or by subjecting it to a blast of air while hot, but not hot enough to take fire.

As regards the first method, the charcoal may be heated to a moderate temperature and a stream of chlorine passed through it. The temperature generally need not attain visible red heat, and 300° C. is usually sufficient, though for certain varieties of charcoal a higher temperature may be found advantageous in shortening the time of treatment required. In the same manner, dense forms of charcoal not initially satisfactory for the absorption of gases may be rendered satisfactory. For example, I have found that a dense form of charcoal prepared in known manner by the carbonization of briquettes made from peat, became after treatment with chlorine in the manner described superior, volume for volume, to the best wood-charcoals in absorbing power, though previously to this treatment it was useless for the purpose.

As regards the second method, the improvement in the absorbing qualities of charcoal and its revivification after use by subjecting it while hot to a current of air, the effect produced appears to be due to a slow oxidation of the charcoal and to be analogous to the known effect produced in the same manner in the revivification of bone-black or animal charcoal which has, by use, lost its power of decolorizing sugar solutions and the like, and in the revivification of wood charcoal that has with use, lost its power of precipitating gold and silver from cyanide solutions. As in these cases, the treatment consists in heating the charcoal in closed vessels in a blast of air at a temperature below its ignition point, care being exercised that the charcoal does not ignite. The ignition point of wood-charcoal in air is 350° C., but slow oxidation occurs and can be detected at a temperature more than 100° below this. In large masses, the heat generated by this slow combustion may raise the temperature of the charcoal locally to the ignition temperature, although initially its temperature may have been far below it. To quench the charcoal should it go on fire, the blast of air may be temporarily suspended and a blast of steam substituted for it. Or, the process may be carried out in a mixed blast of air and steam, for it is known that steam as well as oxygen exercises a beneficial effect in restoring and improving the absorbing power of charcoal.

As already stated, when unpurified coal-gas containing sulphur compounds is treated by the method described, the charcoal deteriorates in absorbing power more rapidly than when purified gas is treated. Nevertheless, crude coal-gas after it has been freed from tar and ammonia in known manner, may be treated by charcoal for removing illuminants if the charcoal is revivified when necessary by passing through it, while hot, a current of air. By arranging that, in the preliminary scrubbing for the liquid illuminants, sufficient charcoal is employed to hold back the sulphur compounds, and by periodically revivifying this charcoal in the manner described, the charcoal used in the subsequent scrubbing for the gaseous illuminants may be preserved from deterioration, even when crude coal-gas is treated.

Having thus described the nature of the said invention and the best means I know of carrying the same into practical effect, I claim:—

1. A process of treating coal-gas to separate methane, carbon monoxide and hydrogen on the one hand from naphthalene, benzene, ethylene and other illuminants on the other hand, which process consists in relatively moving in contact with each other coal-gas and charcoal which is not cooled substantially below the ordinary temperature.

2. A process of separating from coal-gas methane, carbon monoxide and hydrogen on the one hand and naphthalene, benzene and ethylene and other illuminants on the other hand and recovering the naphthalene, benzene and ethylene and other illuminants which process consists in relatively moving in contact with each other coal-gas and charcoal which is not cooled substantially below the ordinary temperature and then heating the charcoal to expel the last named compounds.

3. A process of treating coal-gas to separate methane, carbon monoxide and hydrogen on the one hand from naphthalene, benzene, ethylene and other illuminants on the other hand, which consists in passing coal-gas over charcoal which is not cooled substantially below ordinary temperature until ethylene is present in the issuing gas.

4. A process of stripping naphthalene, benzene and liquid illuminants from coal-gas which consists in passing coal-gas over charcoal which is not cooled substantially below ordinary temperature and then heating the charcoal to expel these compounds.

5. A process of treating coal-gas to separate the non-illuminant hydrocarbon and other gases from the illuminants, which process consists in relatively moving in contact with each other in stages coal gas and charcoal which is not cooled substantially below the ordinary temperature, whereby the less volatile illuminants are removed mainly in the first stage and the more volatile by the subsequent stages.

6. A process of treating coal-gas to separate the non-illuminant hydrocarbon and other gases from the illuminants, which process consists in relatively moving in contact with each other coal gas and charcoal and applying heat in such a manner that the charcoal is first exposed to the gas at substantially the ordinary temperature, is then heated while illuminants are being withdrawn from it, is then cooled and is then exposed to fresh gas.

7. A process of treating coal gas to separate the non-illuminant hydrocarbon and other gases from the illuminants, which process consists in relatively moving in contact with each other coal gas and charcoal and applying heat in such a manner that the charcoal is first exposed to the gas at substantially the ordinary temperature, is then heated while illuminants are being withdrawn from it, is then exposed to gas which has previously been deprived of illuminants by the charcoal, is then cooled and is then exposed to fresh gas.

8. A process of treating coal-gas to separate the non-illuminant hydrocarbon and other gases from the illuminants, which consists in moving in opposite directions in contact with each other coal-gas and charcoal, and applying heat in such a manner that the charcoal is first exposed to the gas at substantially the ordinary temperature, is then heated while illuminants are being withdrawn from it, is then cooled and is then exposed to fresh gas.

9. A process of treating coal-gas to separate the non-illuminant hydrocarbon and other gases from the illuminants, which process consists in moving in opposite directions in contact with each other coal-gas and charcoal and applying heat in such a manner that the charcoal is first exposed to the gas at substantially the ordinary temperature, is then heated while illuminants are being withdrawn from it, is then cooled and during cooling exposed to gas which has previously been deprived of illuminants by the charcoal, and is then exposed to fresh gas.

10. A process of treating coal-gas to separate the non-illuminant hydrocarbon and other gases from the illuminants, which process consists in relatively moving in contact with each other coal-gas and charcoal which is substantially at the ordinary temperature, separating from the gas which has been thus treated a portion of the gas and passing this portion through the charcoal after the main portion of gas has left the charcoal, for the purpose set forth.

11. In a process of treating coal-gas to separate the non-illuminant hydrocarbon and other gases from the illuminants by means of charcoal, the step which consists in concentrating the illuminants absorbed by the charcoal by heating the charcoal containing the illuminants and withdrawing the expelled gases in two portions in such a manner that the portion evolved during the initial stage of the heating is withdrawn through a cooler part of the charcoal and the portion evolved during the later stages of the heating is withdrawn through a hotter part of the charcoal.

In testimony whereof I have signed my name to this specification.

FREDERICK SODDY. [L. S.]

Witnesses:
ROBT. TODD,
ANGUS ALEXANDER.